W. H. RINEBOLD
ODOMETER
APPLICATION FILED SEPT. 24, 1917.

1,265,960.

Patented May 14, 1918.

Inventor
W. H. RINEBOLD
By Watson E. Coleman
Attorney

UNITED STATES PATENT OFFICE.

WILBERT H. RINEBOLD, OF FOSTORIA, OHIO.

ODOMETER.

1,265,980.

Specification of Letters Patent.

Patented May 14, 1918.

Application filed September 24, 1917. Serial No. 192,997.

*To all whom it may concern:*

Be it known that I, WILBERT H. RINEBOLD, a citizen of the United States, residing at Fostoria, in the county of Seneca and State of Ohio, have invented certain new and useful Improvements in Odometers, of which the following is a specification, reference being had to the accompanying drawings.

This invention relates to improvements in odometers such as are commonly employed upon motor vehicles, and has for its primary object to provide means which will indicate to the operator of the vehicle that the various parts of the driving mechanism require attention at the expiration of a certain predetermined number of miles traversed by the machine.

It is another and more particular object of the invention to provide on the faces of certain of the numeral wheels of the odometer, symbols or characters readily distinguishable from each other and indicative of different parts of the driving mechanism of the vehicle.

It is also a further general object of my invention to provide indicative means of the character above stated which will not require any material alterations in the construction of the ordinary odometer and which may be embodied in the speedometer construction without increasing the manufacturing cost thereof to any material extent.

Figure 1:
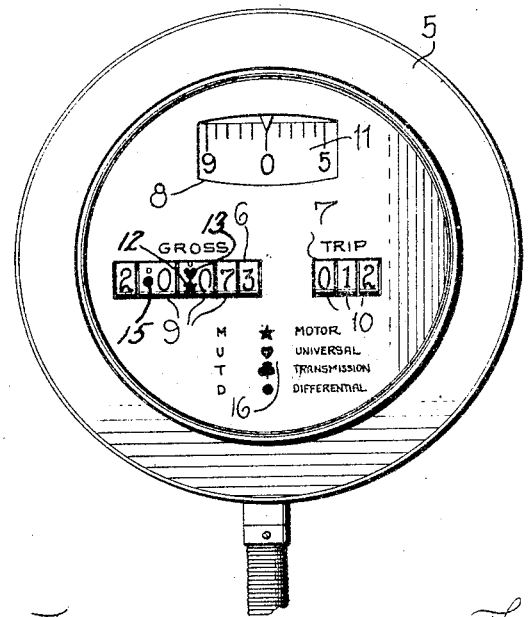
Figure 2:
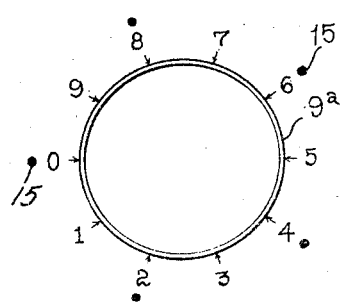
Figure 3:
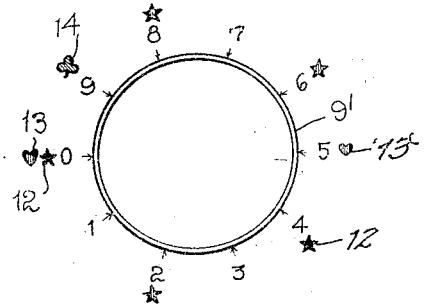

With the above and other objects in view, my invention consists in the novel features of construction, combination, and arrangement of parts to be hereinafter more fully described, claimed, and illustrated in the accompanying drawing, in which, Figure 1 is a front elevation of an odometer provided with the present invention illustrating one embodiment thereof; and Figs. 2 and 3 are diagrammatic views of the hundredths and thousandths numeral wheels of the odometer which indicate the gross mileage covered by the machine.

Referring in detail to the drawing, 5 designates the odometer casing which is provided in its front wall with sight openings 6, 7 and 8 respectively. Numeral carrying wheels 9, the indicia of which appear in the sight openings 6, are indicative of the gross mileage, while the indicia on the numeral wheels 10 appearing in the sight openings 7 indicate the miles covered in the individual trip. The indicia on the wheel 11 which appears in the sight opening 8, indicate fractional parts of a mile.

The hundredths and thousandths wheels indicating the gross mileage, designated 9' and 9ª respectively, are relatively wide, as clearly seen in Fig. 1 of the drawings, and on the peripheral face of the hundredths wheel, opposite the characters 0, 2, 4, 6, and 8, a red star shown at 12 is printed or otherwise delineated. This star indicates that the motor of the machine requires oiling, and immediately adjacent the star the letter M appears on the face of the wheel, as clearly seen in Fig. 1. This wheel 9' is also provided opposite the characters 0 and 5 with a red heart or other symbol which may be readily distinguished from the star, and this heart, shown at 13, appearing in the sight opening at the expiration of each five hundred miles of travel, indicates that the universal driving connections should be oiled. There is also provided on the face of the numeral wheel 9' opposite the numeral 8, a clover leaf or other symbol printed green, as shown at 14. This symbol appearing in the sight opening indicates at the expiration of every one thousand miles traveled, that the transmission requires oiling. Adjacent to the symbols 13 and 14, the letters U and T respectively are printed.

On the face of the thousandths wheel 9ª, opposite each of the characters 0, 2, 4, 6, and 8, a dot or other symbol printed green, as shown at 15, appears and is indicative of the differential gearing. Thus, when one of these dots appears in the sight opening at the end of each two thousand miles of travel, the differential gearing must be oiled. Adjacent to each dot, the letter D is printed on the wheel.

On the face plate of the odometer casing, below the sight openings 6 and 7, a key to the various symbols on the numeral wheels, as indicated at 16, is provided.

From the foregoing description, taken in connection with the accompanying drawing, it will be seen that I have provided a very simple means whereby the driver or operator of the machine may be advised of the proper times for the lubrication or oiling of the various parts of the motor mechanism, thus obviating the possibility of improper operation, undue wear, or breakage of the various parts due to insufficient lubrication. It will be seen that my invention may be readily adapted to the ordinary odometer now upon the market without necessitating changes of any character whatsoever in its construction. The invention may obviously be employed in conjunction with the odometer and at very slight additional cost in the manufacture thereof.

While I have herein shown and described the preferred arrangement of the various indicative symbols or characters and the form thereof, it is to be understood that many variations thereof might be adopted and additional symbols having reference to other parts of the mechanism provided without departing from the essential feature or sacrificing any of the advantages of the invention as claimed.

Having thus fully described my invention, what I desire to claim and secure by Letters Patent is:

1. A device of the character described comprising a casing provided with a sight opening and numeral wheels readable through the sight opening, of indicative characters or symbols contradistinguished from each other on certain of the numeral wheels contiguous to certain of the numerals thereon, said characters indicating at the expiration of predetermined periods of operation of the device that different parts of the vehicle motor mechanism require attention.

2. A device of the character described comprising a casing provided with a sight opening and numeral wheels readable through the sight opening, of characters or symbols on the face of the hundredths numeral wheel adjacent certain of the numerals indicating that the vehicle motor requires oiling at the end of a predetermined period of operation of the machine, other characters on the face of the numeral wheel indicating that the universal driving connections require oiling at other predetermined periods of operation of the machine, an additional character or symbol on the face of said wheel indicating that the transmission gearing requires oiling at the expiration of another period of operation of the machine, and characters or symbols on the face of the thousandths numeral wheel opposite certain of the numerals thereon indicating that the differential gearing requires oiling at the expiration of certain predetermined periods of operation of the machine.

In testimony whereof I hereunto affix my signature in the presence of two witnesses.

WILBERT H. RINEBOLD.

Witnesses:
PERRY J. BIGHAM,
WILLIAM MARTETTE.